United States Patent
Lowe

(10) Patent No.: US 11,860,505 B2
(45) Date of Patent: Jan. 2, 2024

(54) IMAGING DEVICE

(71) Applicant: MBDA UK LIMITED, Stevenage (GB)

(72) Inventor: Antony Joseph Frank Lowe, Bristol South Gloucestershire (GB)

(73) Assignee: MBDA UK Limited, Stevenage (GB)

( * ) Notice: Subject to any disclaimer, the term of this patent is extended or adjusted under 35 U.S.C. 154(b) by 110 days.

(21) Appl. No.: 16/979,643

(22) PCT Filed: Mar. 7, 2019

(86) PCT No.: PCT/GB2019/050638
§ 371 (c)(1),
(2) Date: Sep. 10, 2020

(87) PCT Pub. No.: WO2019/175549
PCT Pub. Date: Sep. 19, 2019

(65) Prior Publication Data
US 2021/0364883 A1    Nov. 25, 2021

(30) Foreign Application Priority Data

Mar. 12, 2018 (GB) .................................... 1803948

(51) Int. Cl.
*G02F 1/29* (2006.01)
*F41G 7/22* (2006.01)
*H04N 23/80* (2023.01)

(52) U.S. Cl.
CPC .............. *G02F 1/294* (2021.01); *F41G 7/22* (2013.01); *H04N 23/80* (2023.01)

(58) Field of Classification Search
CPC ......... G02F 1/133528; G02F 2201/123; G02F 1/134363; G02F 1/136227; G02F 1/1368;
(Continued)

(56) References Cited

U.S. PATENT DOCUMENTS 4,637,571 A * 1/1987 Holder .................. F41G 7/2253
244/3.11
5,400,161 A 3/1995 Lambert, Jr.
(Continued)

FOREIGN PATENT DOCUMENTS

CN         106610542 A      10/2015
JP         2006251613 A      9/2006
(Continued)

OTHER PUBLICATIONS

Ayutthaya, et al., "Adaptive Focal Length Imaging System using Liquid Crystal Spatial Light Modulator," Indian Journal of Science and Technology, vol. 9(48). Dec. 2016. 5 pages.
(Continued)

*Primary Examiner* — Daniel Chang
(74) *Attorney, Agent, or Firm* — Finch & Maloney PLLC

(57) ABSTRACT

An imaging device includes: an array of liquid crystal cells, each liquid crystal cell providing a respective phase shift to electromagnetic radiation passing through the liquid crystal cell; control electronics for controlling the phase shifts provided by each of the liquid crystal cells; a detector; and an image processor for generating an image from electromagnetic radiation detected by the detector. The array of liquid crystal cells form a plurality of patches; and the control electronics is configured to control the phase shifts of the cells of each patch to form each patch into a respective lens that focuses electromagnetic radiation towards the detector such that the plurality of patches form an array of lenses.

20 Claims, 6 Drawing Sheets

(58) Field of Classification Search
CPC .............. G02F 1/134309; G02F 1/1337; G02F 1/134345; G02F 1/133526; G02F 1/133308; G02F 1/133524; G02F 2203/12; G02F 2203/50; G09G 3/36; G09G 3/3611; G02B 30/27; G02B 26/0833; G02B 27/0176; G02B 26/06; G02B 30/28; G02B 2027/0138; H04N 13/305; H04N 5/7441; H04N 13/31; H04N 9/3108; H04N 5/7416

See application file for complete search history.

(56) References Cited

U.S. PATENT DOCUMENTS

| | | | | |
|---|---|---|---|---|
| 5,654,805 | A * | 8/1997 | Boon | H04N 5/45 382/233 |
| 5,815,233 | A * | 9/1998 | Morokawa | G02F 1/29 349/200 |
| 5,883,687 | A * | 3/1999 | Lu | G02F 1/1396 349/181 |
| 6,100,984 | A * | 8/2000 | Chen | G01B 11/2527 250/559.22 |
| 9,103,992 | B1 * | 8/2015 | Day | G02B 6/3512 |
| 9,594,277 | B1 * | 3/2017 | Fu | G02F 1/133723 |
| 10,416,498 | B2 * | 9/2019 | Liao | G02F 1/135 |
| 2002/0015135 | A1 * | 2/2002 | Hansen | G02B 27/283 353/31 |
| 2002/0067888 | A1 * | 6/2002 | Morozov | G02B 6/2931 385/37 |
| 2004/0207922 | A1 * | 10/2004 | Grier | G02B 26/0808 359/601 |
| 2004/0264695 | A1 * | 12/2004 | Turpin | H04B 10/85 380/200 |
| 2008/0106778 | A1 * | 5/2008 | Ma | G02B 6/3556 359/223.1 |
| 2009/0097116 | A1 * | 4/2009 | Laczik | G02B 27/0025 349/194 |
| 2010/0118219 | A1 * | 5/2010 | Leister | G02F 1/1393 349/18 |
| 2011/0128412 | A1 * | 6/2011 | Milnes | H04N 13/211 348/222.1 |
| 2012/0007765 | A1 * | 1/2012 | Margomenos | H01Q 21/065 342/175 |
| 2015/0002798 | A1 * | 1/2015 | Miyakawa | G02F 1/134309 349/123 |
| 2015/0029454 | A1 * | 1/2015 | Xie | G02F 1/133788 445/24 |
| 2015/0070607 | A1 * | 3/2015 | Usukura | G02B 30/31 349/15 |
| 2015/0092125 | A1 * | 4/2015 | Kim | G01B 11/2441 349/33 |
| 2015/0301400 | A1 * | 10/2015 | Kimura | H04N 13/00 349/110 |
| 2015/0323820 | A1 * | 11/2015 | Li | G02F 1/1337 445/6 |
| 2015/0338633 | A1 * | 11/2015 | Li | G02B 23/12 359/425 |
| 2015/0381877 | A1 | 12/2015 | Ye et al. | |
| 2016/0025992 | A1 * | 1/2016 | Van Der Zouw | G01N 21/9501 359/489.08 |
| 2016/0223817 | A1 | 8/2016 | Kizu et al. | |
| 2016/0342030 | A1 * | 11/2016 | Kim | G02F 1/1341 |
| 2016/0357146 | A1 * | 12/2016 | Brooker | G03H 1/041 |
| 2017/0003507 | A1 * | 1/2017 | Raval | G02B 27/0176 |
| 2017/0106476 | A1 * | 4/2017 | Sakamoto | B23K 26/064 |
| 2017/0184776 | A1 * | 6/2017 | El-Ghoroury | G02B 30/50 |
| 2017/0192306 | A1 * | 7/2017 | Song | G02F 1/133753 |
| 2018/0180967 | A1 * | 6/2018 | Gao | G09G 3/36 |
| 2018/0220057 | A1 | 8/2018 | Wang et al. | |
| 2019/0033234 | A1 * | 1/2019 | Ben Ezer | H01L 22/12 |
| 2019/0056635 | A1 * | 2/2019 | Kim | G02B 30/56 |
| 2019/0146283 | A1 * | 5/2019 | Qin | G02F 1/13306 349/139 |
| 2019/0369254 | A1 * | 12/2019 | Dumais | G02F 1/292 |
| 2020/0012159 | A1 * | 1/2020 | Wang | G02F 1/136209 |
| 2020/0142178 | A1 * | 5/2020 | Vollmerhausen | H01Q 21/064 |
| 2021/0255497 | A1 * | 8/2021 | Yanai | G02B 5/02 |
| 2022/0179282 | A1 * | 6/2022 | Chang | G09G 3/2025 |

FOREIGN PATENT DOCUMENTS

| | | | | |
|---|---|---|---|---|
| WO | | 2017202065 | A1 | 11/2017 |
| WO | WO-2017202065 | A1 * | 11/2017 | .............. G02F 1/29 |
| WO | | 2019175549 | A1 | 9/2019 |

OTHER PUBLICATIONS

Curatu, George, "Analysis and Design of Wide-angle Foveated Optical Systems," Electronic Theses and Dissertations, 2009. 181 pages.

International Preliminary Report on Patentability received for PCT Application no. PCT/GB2019/050638, dated Sep. 24, 2020. 13 pages.

International Search Report and Written Opinion received for PCT Application No. PCT/GB2019/050638, dated Aug. 7, 2019. 15 pages.

GB Search Report under Section 17(5) received for GB Application No. 1803948.7 dated Sep. 11, 2018. 4 pages.

* cited by examiner

IMAGING DEVICE

FIELD OF THE INVENTION

The present invention relates to the field of imaging devices. More particularly, but not exclusively, this invention concerns an imager that uses a Spatial Light Modulator (SLM) to form an image of a scene or other object.

BACKGROUND OF THE INVENTION

An electrically addressed SLM comprises an array of liquid crystal cells, the SLM being electronically addressed to allow control of the refractive indices of the cells. Changing the refractive index of a cell yields a corresponding change in the optical path length through the cell, and therefore in the delay experienced by (polarised) electromagnetic radiation that is incident on and passes through the cell. Applying an appropriate distribution of refractive indices to the cells of the SLM allows the SLM to form an optical gradient-index (GRIN) lens. However, the maximum change in refractive index that can be introduced to each liquid crystal cell is typically around ±0.2. A lens formed by an SLM has a minimum focal length which is limited by the possible variation in cell refractive index, and a larger lens results in a longer minimum focal length. Therefore, a lens formed using this technique will be relatively weak, having a long minimum focal length relative to the width of the lens. However, a lens with a large width, and therefore a larger aperture, is advantageous because it provides a higher quality image. Therefore a trade-off must be made between image quality and minimum focal length.

Whilst prior art SLM lenses are unsuitable for many applications due to their inherently long focal length relative to lens width, such a lens may effectively be used in support of a fixed lens. SENIWONG NA AYUTTHAYA ET AL in "Adaptive Focal Length Imaging System using Liquid Crystal Spatial Light Modulator" (10.17485/ijst/2016/v9i48/109312) disclose an imaging device comprising a fixed lens and an SLM. The SLM is positioned parallel to the fixed lens, on the optical axis of the fixed lens. The refractive indices of the liquid crystal cells of the SLM are electrically controlled such that the SLM approximates a lens. Electromagnetic radiation from the target scene of the system passes through, and is therefore focussed by, both the fixed lens and the SLM. The majority of the focussing power of the imaging device is provided by the fixed lens. The SLM, which can provide only weak focussing power but is electronically controllable, is used to vary the focal length of the imaging device from that of the fixed lens. Thereby an imaging device is provided with a focus which may be fine-tuned electronically, without the need for any moving parts. However, the range of focal lengths achievable by the imaging device is still constrained by the limits on the focussing power that can be provided by the SLM, and is largely determined by the fixed lens.

A prior art SLM may be used to provide foveated imaging, in which image resolution varies across an image according to a position of a fixation point. The fixation point is a part of the target scene which is imaged at a higher resolution than the rest of the scene. CURATU in "Analysis and Design of Wide-angle Foveated Optical Systems" (CFE0002584) discloses an imaging device comprising a fixed lens and an SLM. The SLM is positioned parallel to the fixed lens, on the optical axis of the fixed lens. The refractive indices of the liquid crystal cells of the SLM are electronically controlled such that the SLM corrects for the wavefront aberrations introduced by the part of the fixed lens corresponding to the fixation point. Thereby, the image quality at the fixation point is improved compared with that of the rest of the image.

However, each of the above described imaging devices still requires the use of a fixed optical lens, which increases the physical space required by, and constrains the flexibility of, the overall imaging device.

The present invention seeks to mitigate one or more of the above-mentioned problems.

SUMMARY OF THE INVENTION

The present invention provides, according to a first aspect, a method of imaging comprising:
 providing an array of liquid crystal cells, each cell providing a phase shift to electromagnetic radiation passing through the cell;
 controlling the phase shifts provided by each of the liquid crystal cells; and
 detecting the electromagnetic radiation that has passed through the liquid crystal cells
 wherein:
 the method comprises controlling the phase shifts of the cells to form a plurality of lenses that focus electromagnetic radiation.

The present invention provides, according to a second aspect, an imaging device including:
 an array of liquid crystal cells, each providing a phase shift to electromagnetic radiation passing through the cell;
 control electronics for controlling the phase shifts provided by each of the liquid crystal cells;
 a detector; and
 an image processor for generating an image from electromagnetic radiation detected by the detector;
 wherein:
 the array of cells form a plurality of patches; and
 the control electronics is configured to control the phase shifts of the cells of each patch to form each patch into a respective lens that focuses electromagnetic radiation towards the detector such that the patches form an array of lenses.

According to a third aspect of the invention there is provided an imaging device for use in or on a missile seeker.

According to a fourth aspect of the invention there is provided a missile incorporating any of the first to third aspects of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
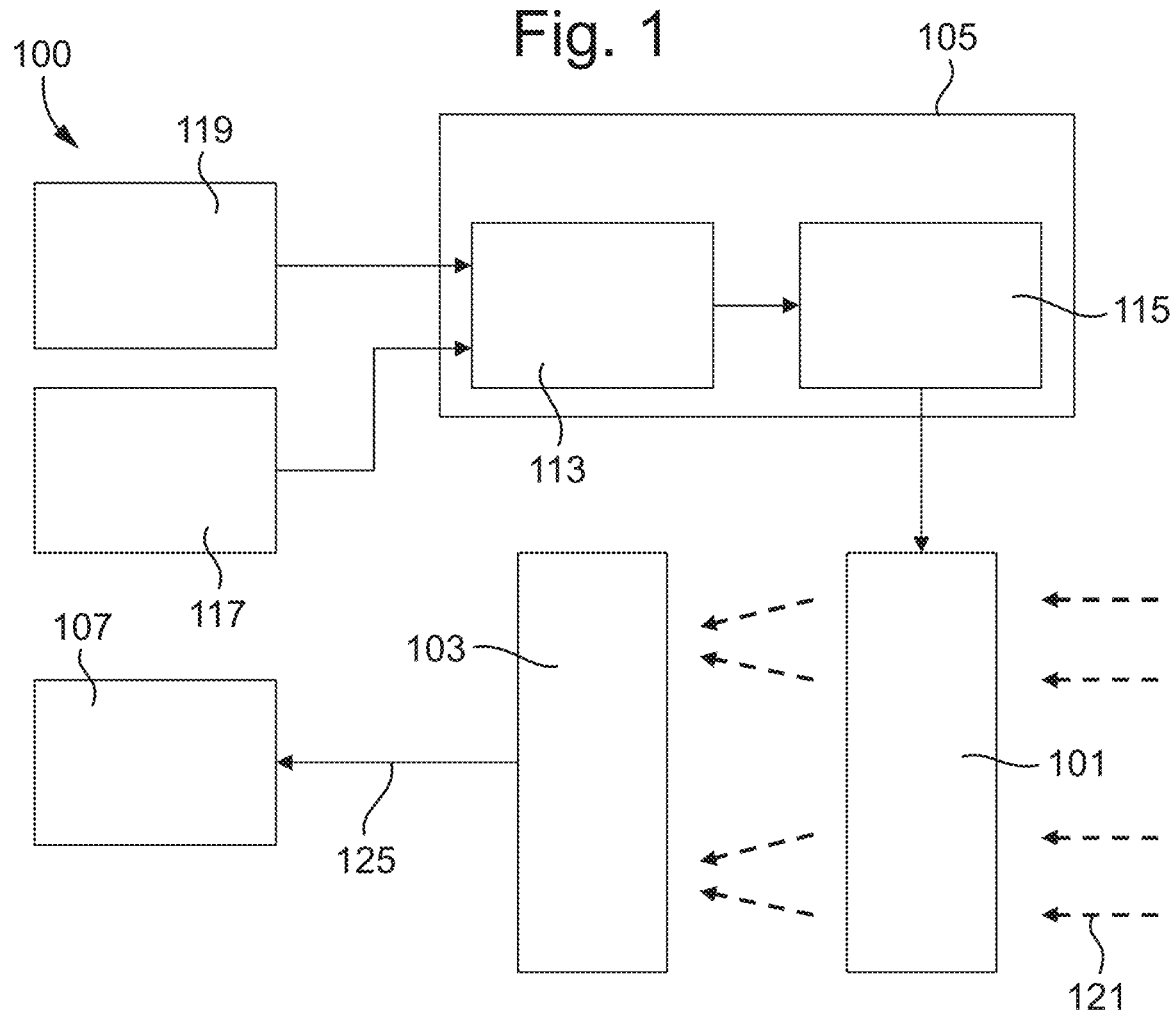
FIG. 1 is a system block diagram of an imaging device according to a first example embodiment of the invention.

The present invention provides, according to a first aspect, a method of imaging comprising:

providing an array of liquid crystal cells, each cell providing a phase shift to electromagnetic radiation passing through the cell;

controlling the phase shifts provided by each of the liquid crystal cells; and detecting the electromagnetic radiation that has passed through the liquid crystal cells wherein:

the method comprises controlling the phase shifts of the cells to form a plurality of lenses that focus electromagnetic radiation.

Each of the plurality of lenses formed may provide the same or substantially the same focussing power.

The array of liquid crystal cells may be comprised in a liquid crystal spatial light modulator. The liquid crystal spatial light modulator may be a transmissive liquid crystal spatial light modulator. The method may further comprise the step of receiving an input of characteristics of the array of liquid crystal cells. The characteristics may comprise fixed values defining the array of liquid crystal cells and its relationship with the detector. The characteristics may comprise one or more of: the dimensions of the array of liquid crystal cells in terms of number of cells, cell width and height, cell thickness, the distance of the array of liquid crystal cells from the detector, and the maximum change in refractive index that may be induced in a cell.

The method may further comprise the step of de-multiplexing one or more images and/or signals from the detected electromagnetic radiation.

The method may further comprise the step of sharpening one or more images associated with the detected electromagnetic radiation.

The method may further comprise the step of super-resolving a plurality of images associated with the detected electromagnetic radiation.

The use of a plurality of, typically small, lenses (patches) to form a Multi-Image and the subsequent application of super-resolution overcomes some of the limitations of prior art SLM lens based imaging devices. The minimum focal distance is determined by the width of the patch, but the super-resolved image is of a much higher quality than would be achievable by use of the single patch alone. This enables an SLM to form the basis of a very shallow imaging device.

Embodiments of the invention can simplify non-uniformity correction of focal plane array detectors. Traditionally, non-uniformity correction requires periodically interposing a uniform scene in front of the imager. However, if all of the cells of an embodiment of the invention are set to the same refractive index, then the SLM will provide no focussing. All of the detector pixels will therefore be exposed to a uniform illumination at the mean scene intensity, providing a uniform scene for non-uniformity correction.

Controlling the phase shifts of the cells to form a plurality of lenses may comprise controlling the phase shifts of the cells to form a plurality of areas, wherein: each of the plurality of areas consists of a subset of the plurality of lenses; each of the lenses of an area provides substantially the same focussing power, such that each of the plurality of areas may be said to have a focussing power; and each area is controlled to provide a different focussing power to that of others of the plurality of areas.

Embodiments of the invention can provide highly reconfigurable imaging device. Any commandable SLM configuration can be applied at the SLM frame rate. Such frame rates are typically 10s or 100s of Hz. Commandable SLM configurations include variation in number, size, shape and focal length of patches. In embodiments of the invention, not only can the configuration be changed whenever required, but the SLM cells can also be configured into as many arrangements of patches as desired. In other words, one can divide the SLM into various areas and configure the patches differently in each of the areas, for example providing higher FOV in one area and higher sensitivity in another.

The present invention provides, according to a second aspect, an imaging device including:

an array of liquid crystal cells, each providing a phase shift to electromagnetic radiation passing through the cell;

control electronics for controlling the phase shifts provided by each of the liquid crystal cells;

a detector; and an image processor for generating an image from electromagnetic radiation detected by the detector;

wherein:

the array of cells form a plurality of patches; and the control electronics is configured to control the phase shifts of the cells of each patch to form each patch into a respective lens that focuses electromagnetic radiation towards the detector such that the patches form an array of lenses.

The use of a plurality of lenses can enable an imaging device with an inherently wide dynamic range due to the use of multiple patches, as each point of the target scene is sampled by multiple detector pixels (one for each of the patches).

The detector may be positioned parallel and adjacent to the array of liquid crystal cells.

The detector may be an uncooled long wave infra-red focal plane array. The detector may be an uncooled visible light detector. The detector may be an uncooled short wave infra-red detector. The detector may be a cooled infra-red detector.

The imaging device may comprise a dewar. The detector may be positioned inside the dewar, for example at an end of the dewar nearest to the array of liquid crystal cells.

The detector may be of the same width as the array of liquid crystal cells. The detector may be spaced apart from the array of liquid crystal cells. The spacing apart of the detector and array of liquid crystal cells may be between 0.1 mm and 10 mm, for example 1 mm.

The spacing between the detector and the array of liquid crystal cells may be adjustable. The control electronics may be configured to control the separation of the detector and the array of liquid crystal cells.

The detector may be positioned at an angle relative to the array of liquid crystal cells, such that there is a sloped separation between the detector and the array of liquid crystal cells.

The control electronics may be configured to receive an input of characteristics of the array of liquid crystal cells.

The characteristics may comprise fixed values defining the array of liquid crystal cells and its relationship with the detector. The characteristics may comprise one or more of: the dimensions of the array of liquid crystal cells in terms of number of cells, cell width and height, cell thickness, the distance of the array of liquid crystal cells from the detector, and the maximum change in refractive index that may be induced in a cell.

The control electronics may be configured to, on the basis of the inputted characteristics of the array of liquid crystal cells, calculate metrics comprising one or more of: a field of view, resolution, sensitivity, dynamic range, and number of discrete patch arrangements achievable by the imaging device. The control electronics may be configured to present the calculated metrics to a user. The control electronics may be provided with a user selected configuration. The user selected configuration may be based on the calculated metrics. The user selected configuration may define desired imager properties.

The control electronics may comprise a patch control function. The patch control function may be configured to calculate the nature, size, and number of patches required to apply the user selected configuration. The control electronics may comprise a cell control function. The cell control function may be configured to calculate the individual cell refractive index values required to instantiate the patches. The cell control function may be configured to assign the cell refractive index values to the liquid crystal cells.

The array of liquid crystal cells may be planar.

Each of the patches may be the same shape. Each of the patches may be the same size. Each of the patches may be formed of a contiguous group of the liquid crystal cells. Each of the patches may be formed of an equal number of the liquid crystal cells. The patches may be rectangular in shape. The patches may be irregularly shaped.

Arranging the cells of the array of liquid crystal cells to be planar, formed of a contiguous group of cells, and/or rectangular in shape can reduce the computational complexity of the required image processing. An imaging device with rectangular patches can provide higher resolution in one axis than the other.

The lenses formed by the patches may be graded index lenses. The lenses may have a radially stepped refractive index profile.

The control electronics may be configured to vary the patch focal lengths vary the patch focal lengths to provide zoom functionality. Providing a zoom function by varying the patch focal lengths, can enable an electronically controlled zoom function which can change magnification at the frame rate of the SLM.

The imaging device may further comprise a polariser. The polariser may be arranged such that the array of liquid crystal cells is between the polariser and the detector.

It may be that the imaging device does not comprise a fixed lens that provides the majority of the focussing power of the imaging device. It may be that lenses formed by the array of liquid crystal cells are not used to fine-tune the focus of a fixed lens.

The liquid crystal cells may be electrically addressed. The liquid crystal cells may be optically addressed. The liquid crystal cells may be individually addressed. It may be that the liquid crystal cells are not addressed by a nested, annular configuration of electrodes.

The use of individually addressed liquid crystal cells can allow the size, shape, and number of patches to be changed. This can therefore provide a highly reconfigurable imaging device.

The liquid crystal cells may each comprise an electrode. The electrode may be relatively small.

A focal length of each of the plurality of lenses formed may be less than a width of the array.

Use of a plurality of lenses which each have a focal length less than a width of the array can enable the creation of a very low-profile imaging device.

The electromagnetic radiation incident on the detector may comprise both electromagnetic radiation that has passed through a first of the plurality of patches and electromagnetic radiation that has passed through a second of the plurality of patches, such that the electromagnetic radiation that has passed through the first of the plurality of patches is superposed onto the electromagnetic radiation that has passed through the second of the plurality of patches.

The overlapping single images formed by the patches may be said to form a multi-image comprising a combination of the overlapping single images.

The image processor may be configured to provide an image de-multiplexing function. The image de-multiplexing function may be configured to separates the multi-image into a plurality of single images. The image processor may be configured to provide a high dynamic range function.

The multi-image may comprise a convolution of a geometric image of a target scene, a blur function, an intensity profile, a replication function at the patch spacing, and a sampling function of the detector.

The image de-multiplexing function may be configured to extract the plurality of single images by deconvolution. The image de-multiplexing function may be configured to extract the plurality of single images by computational imaging. Computational imaging may comprise using a pursuit algorithm to minimise an error score (for example, an L1 norm) of a transform of an estimated image. The image de-multiplexing function may be configured to extract the plurality of single images by use of a trained machine learning agent.

The image de-multiplexing function may output a signal corresponding to a plurality of images of a target scene. Each of the plurality of images may correspond to one of the plurality of patches.

The patches may be spaced such the images produced by each patch-formed lens do not overlap.

The image processor may be configured to provide a high dynamic range function. The high dynamic range function may be configured to combine the plurality of images to form a single image with high dynamic range.

The image processor may be configured to provide a super-resolution function. The super-resolution function may be configured to generate a high resolution image from a plurality of low resolution images.

The control electronics may be configured to diverge the optical axes of the lenses formed by the patches. Diverging the optical axes of the lenses may comprise controlling each of the patches to introduce an image shift, such that an image produced by a patch is not centred under the patch. Each of the patches may be controlled to introduce a different image shift to the other patches, such that the each of the plurality of resulting single images views the target scene from a unique angle.

Controlling a patch to introduce an image shift may comprise applying a graduated offset to the cells 209 of the patch. The offset applied to a cell may be linearly related to its position within the patch.

The imaging device may comprise a fixed lens. The fixed lens may be arranged parallel and adjacent to the array of liquid crystal cells. The fixed lens may serve to diverge (for example purely to diverge) the optical axes of lenses formed by the patches.

The liquid crystal spatial light modulator may be a reflective liquid crystal spatial light modulator.

The control electronics may be configured to control the refractive indices of the array of liquid crystal cells to provide electronic beam steering. Controlling the refractive indices of the array of liquid crystal cells to provide electronic beam steering may comprise applying a graduated offset to the cells of the patches.

The control electronics may be configured to control the refractive indices of the array of liquid crystal cells to provide image stabilisation, for example to compensate for mechanical shock.

The control electronics may be configured to control the refractive indices of the array of liquid crystal cells to perform depth measurement. Performing depth measurement may comprise varying the focal length of one or more patches of the SLM. Performing depth measurement may comprise determining a measure of the image focus.

Embodiments of the invention may comprise a beam splitter and a relay lens. The beam splitter may be arranged such that the electromagnetic radiation from the target scene is transmitted through the beam splitter, but that electromagnetic radiation reflected back from the array of liquid crystal cells is reflected towards the relay lens. The relay lens may be arranged to project an image of the detector adjacent and parallel to the array of liquid crystal cells, such that electromagnetic radiation reflected from the array of liquid crystal cells onto a surface of the image of the detector is also relayed onto a corresponding surface of the detector itself.

The image processor may provide an image sharpening function.

According to a third aspect of the invention there is provided an imaging device for use in or on a missile seeker.

The shallow nature of the imaging device can provide a substantial space saving, which is particularly important in a missile.

According to a fourth aspect of the invention there is provided a missile incorporating any of the first to third aspects of the invention.

The imaging device may further comprise a gimbal, onto which the detector and array of liquid crystal cells are mounted.

Embodiments of the invention can allow a seeker's performance to be varied to suit mission phase, for example by providing a wide field of view for target acquisition and then switching to fine resolution for target tracking. Embodiments of the invention can allow for a passive seeker to acquire range data to allow it to function as a proximity fuze. Embodiments of the invention can also provide missile athermalisation, by allowing refocussing to counteract the inherent defocussing which occurs due to aerodynamic heating effects.

Example embodiments of the present invention thus provide a method of imaging, wherein the method comprises the following steps:
  providing an array of liquid crystal cells, each cell providing a phase shift to electromagnetic radiation passing through the cell;
  controlling the phase shifts provided by each of the liquid crystal cells to form a plurality of lenses that focus electromagnetic radiation passing through the array; and
  detecting the electromagnetic radiation.

Figure 2:
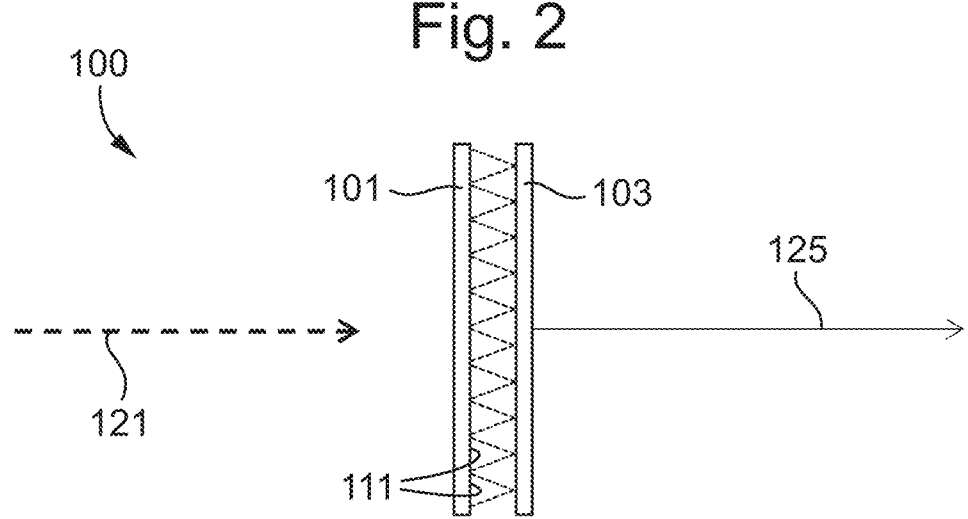
FIG. 2 is a schematic side view of the imaging device of FIG. 1.
Figure 3:
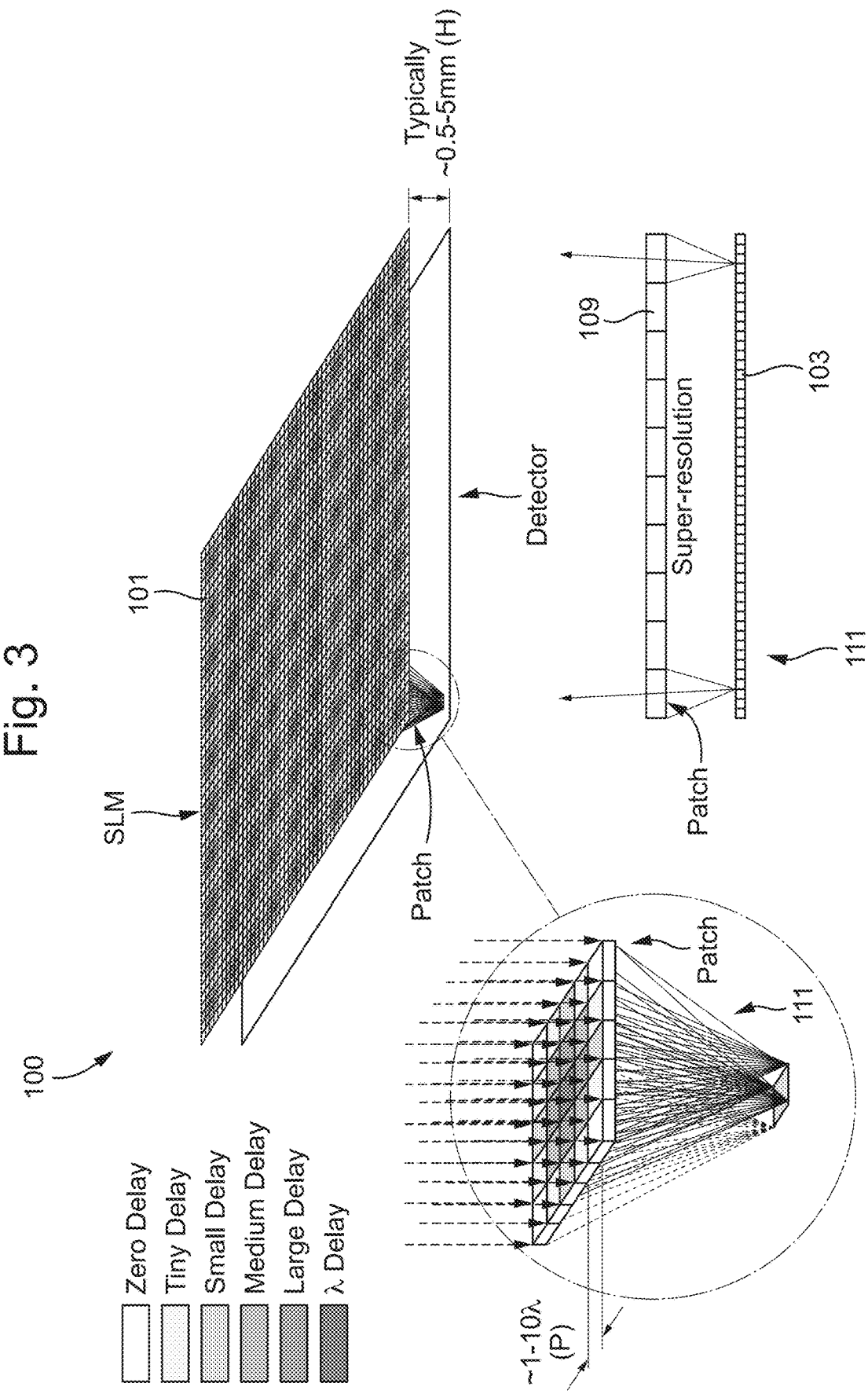
FIG. 3 is more detailed schematic views of parts of the imaging device of FIG. 1.

An imaging device 100 according to a first example embodiment of the invention comprises (FIG. 1) a transmissive liquid crystal Spatial Light Modulator (SLM) 101, itself comprising a plurality of liquid crystal cells 109 (FIG. 3). The imaging device further comprises (FIG. 1) a detector 103, control electronics 105 for controlling the SLM, and an image processor 107 for providing image processing. As shown in more detail in FIG. 2, the detector 103 is positioned parallel and adjacent to the SLM 101, with a spacing of (in this example) 1 mm. The detector 103 is an uncooled long wave infra-red (LWIR) focal plane array of the same width as the SLM 101.

The control electronics 105 comprise (FIG. 1) patch control 113 and cell control 115 functions and are provided with inputs of SLM characteristics 117 and a user selected configuration 119. The SLM characteristics 117 comprise fixed values defining the SLM 101 and its particular physical relationship to the detector 103. In this exemplary embodiment the SLM characteristics 117 include the SLM 101 dimensions in terms of number of cells 109, cell width and height, cell thickness, the distance of the SLM 101 from the detector 103, and the maximum change in refractive index that may be induced in a cell 109.

In operation, the SLM characteristics 117 are provided to the control electronics 105, which calculates the values of FOV, resolution, sensitivity, dynamic range, and number of discrete patch arrangements achievable by the imaging device. These options are presented to the user who selects from them the user selected configuration 119 (FIG. 1) corresponding to the desired imager properties. (In example embodiments of the invention, the "user" may be a software function and is not necessarily the end-user.) The user selected configuration 119 is provided to the patch control function 113 which calculates the nature, size, and number of patches 111 required to apply the user selected configuration 119. This patch information is provided to the cell control function 115 which calculates the individual cell 109 refractive index values required to instantiate those patches 111, and assigns the cell refractive index values to the SLM cells 109.

The liquid crystal cells of the SLM 101 are thereby formed into a plurality of patches 111 and controlled such that each patch 111 forms a respective lens, and therefore the SLM 101 forms a plurality of lenses (FIG. 3). In this example, each of the patches 111 are the same shape and size and formed of a contiguous group of an equal number of the cells 109. Each of the lenses focuses incident electromagnetic radiation 121 onto the surface 123 (FIG. 4) of the detector 103, such that the overall detected image is comprised of a plurality of smaller single images—one for each of the patches 111.

As the patches 111 are each formed of a finite number of cells 109, the GRIN lens formed by a patch 111 will have a radially stepped refractive index profile. Therefore the lenses formed by the SLM 101 will be relatively crude, but the resulting distortion can (if desired) be reduced by image processing. The crudeness of the lenses formed will also be mitigated by SLM cell edge effects, which limit how sharp a transition between neighbouring cells can be achieved and thereby smooth the refractive index profile of the SLM.

Returning to FIG. 1, the detector 103 sends a signal 125 corresponding to the detected pattern of electromagnetic radiation to the image processor 107, which processes the detected pattern to produce an image.

Figure 4:
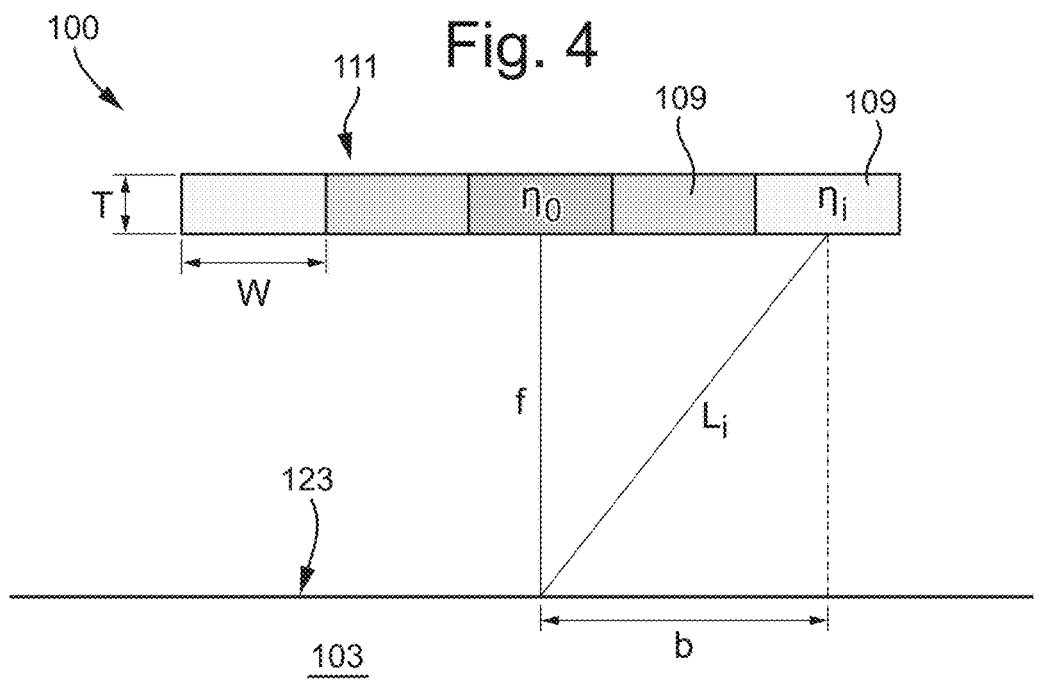
FIG. 4 is a schematic side view of a patch of the imaging device of FIG. 1.

The exact relationship between the configuration details of the SLM 101 and the focal length of the lenses generated by its patches 111 should ideally be characterised individually for each device to minimise minor errors due device-to-device hardware variations. However, the approximate focal length of an SLM lens patch, the optical axis of which is aligned normal to its surface, can generally be expected to be characterised by the following equation (FIG. 4).

$$f = \frac{(w \cdot (n-1))^2 - 4d^2}{8d}$$

$$d = T(\eta_0 - \eta_i)$$

Where:
f=focal length
d=difference in optical path length through the outermost cell of a patch compared with that through the central cell
n=patch width in terms of number of cells
w=cell width
T=cell thickness
$\eta_0$=refractive index of the central cell of the patch
$\eta_i$=refractive index of the outermost cell of the patch A second example embodiment (not separately illustrated) of the invention is the same as the first example embodiment, but for the additional features described below.

As the patches 111 are formed of small sections of the SLM 101 and the detector 103 is much larger than each of the patches, each patch 111 will have a very wide field of view. As a result, the single image formed by any one patch 111 may overlap the single images formed by one or more other patches 111, forming a multi-image comprised of the combination of the overlapping single images.

In the second example embodiment, the image processor 107 further provides image de-multiplexing and high dynamic range (HDR) functions. The image de-multiplexing function receives a signal from the detector 103 corresponding to the detected multi-image and separates the multi-image into its constituent single images.

The multi-image is essentially the convolution of all of the following:
1. The geometric image of the scene being viewed
2. A blur function due to the nature of each lens patch
3. An intensity profile (one would normally expect this to be the fourth power of the cosine of the angle from the centre of the image to any point on the image)
4. A replication function at the patch spacing (i.e. one single image per patch)
5. The sampling function of the detector pixels.

Items 2 to 5 can all be calculated from the known SLM specifications and control values, or measured calibration values as appropriate.

Therefore, it is possible to mathematically extract item 1, the original scene, by the inverse process of deconvolution. However, simple deconvolution is notoriously prone to introducing artefacts and can be very sensitive to image noise. Alternative techniques familiar to one skilled in the art of image processing are available, including: Standard Image Processing, wherein the nominal deconvolution is performed then iteratively improved by using prior knowledge of image characteristics (e.g. the Lucy-Richardson algorithm); Computational Imaging, wherein a pursuit algorithm is used to minimise an error score (e.g. an L1 norm) of the transform of the estimated image; and machine learning, wherein for example a neural net can be taught to solve the problem of converting the captured multi-image into the required single clear image.

The output of the image de-multiplexing function is a signal corresponding to a plurality of images of the target scene, each image corresponding to one of the patches 111. This signal is received by the HDR function, which combines the plurality of single images to produce a single image with high dynamic range. The image processing techniques to perform the HDR function are well known in the art so will not be discussed further here.

Figure 5:
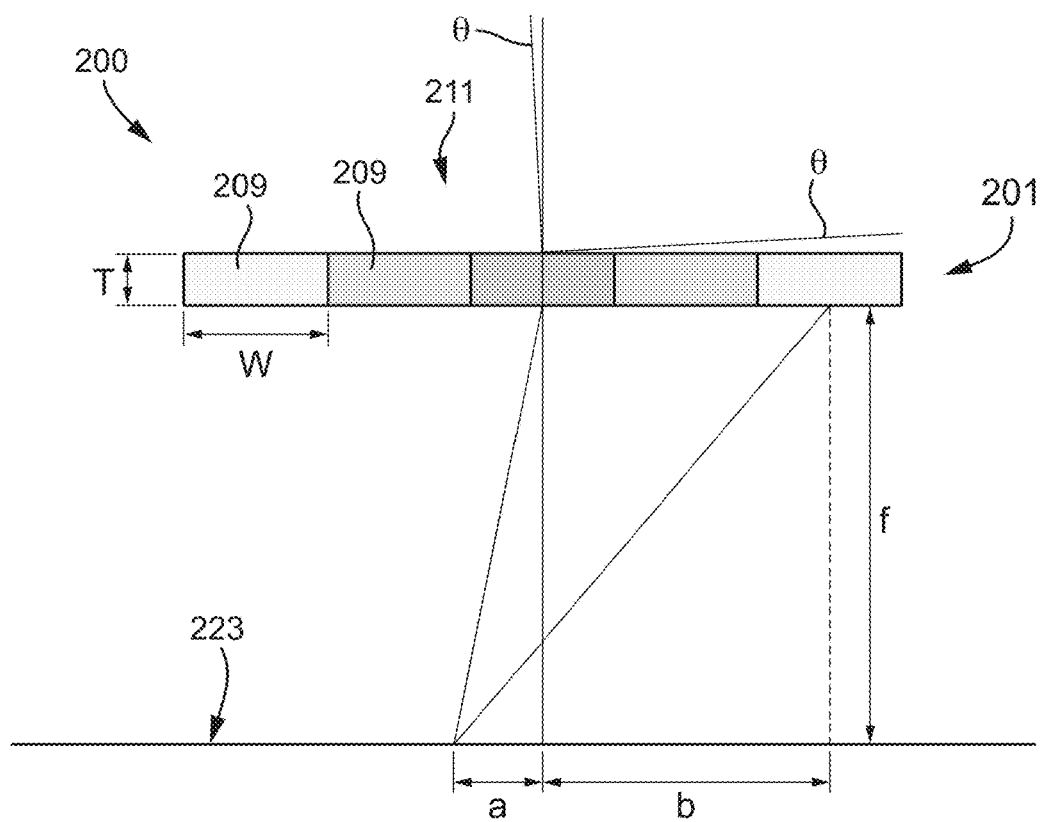
FIG. 5 is a schematic side view of a patch of an imager according to a third embodiment of the invention.

A third example embodiment of the invention (FIG. 5) is the same as the first example embodiment, but for the additional features described below. Similar reference numerals are used to label similar items; thus, the imaging device is labelled 200 and the patches are labelled 211.

This third example embodiment of the invention makes use of super-resolution techniques to generate a high resolution image from a plurality of low resolution images. In order to do so, each of the images must view the target scene from a unique position, such that each image is slightly shifted relative to the others.

Therefore, each patch is further controlled by the patch control module to introduce an image shift, such that the focussed image produced by a patch is not centred under the patch. Each patch 211 of the SLM 201 is controlled to introduce a different image shift to the other patches, such that the each of the plurality of resulting single images view the target scene from a unique angle. In order to introduce the image shift, the cell refractive index used in forming the lens must be constrained, such that some refractive index is kept spare. This spare refractive index is applied as a graduated offset to the cells 209 of the patch 211, such that the offset applied to a cell 209 is linearly related to its position within the patch 211.

The approximate focal length of an SLM lens patch with a given image shift, the optical axis of which is aligned normal to its surface, can generally be expected to be characterised by the following equation.

$$f = \sqrt{\left(\frac{d^2 + \left((n-1)\left(\frac{w}{2}\right)\right)^2 - \left((n-1)\cdot\frac{w}{2}\right)^2 -}{(n-1)\cdot w - 2\cdot d}\right)^2 - a^2}$$

$$d = T(\eta_0 - \eta_i)$$

Where:
f=focal length
d=difference in optical path length through the outermost cell of a patch compared with that through the central cell
n=patch width in terms of number of cells
w=cell width
a=image shift for super-resolution
T=cell thickness
$\eta_0$=refractive index of the central cell of the patch
$\eta_i$=refractive index of the outermost cell of the patch The detected multi-image in this case, compared to that of the second example embodiment, is additionally convoluted with an angular subshift function where the central point of each sub-image is shifted by an amount proportional to its position in the array of patches, in both azimuth and elevation. It is again possible to mathematically extract the original scene, for example by the inverse process of deconvolution.

The image processor further provides a super-resolution function. Super-resolution functions combine a plurality of images of a target scene from differing viewpoints to generate a higher resolution image of the same scene. Super-resolution imaging techniques are well known in the art so will not be described in further detail here. The output of the super-resolution function is a single super-resolved image of higher resolution than the input single images.

Figure 6:
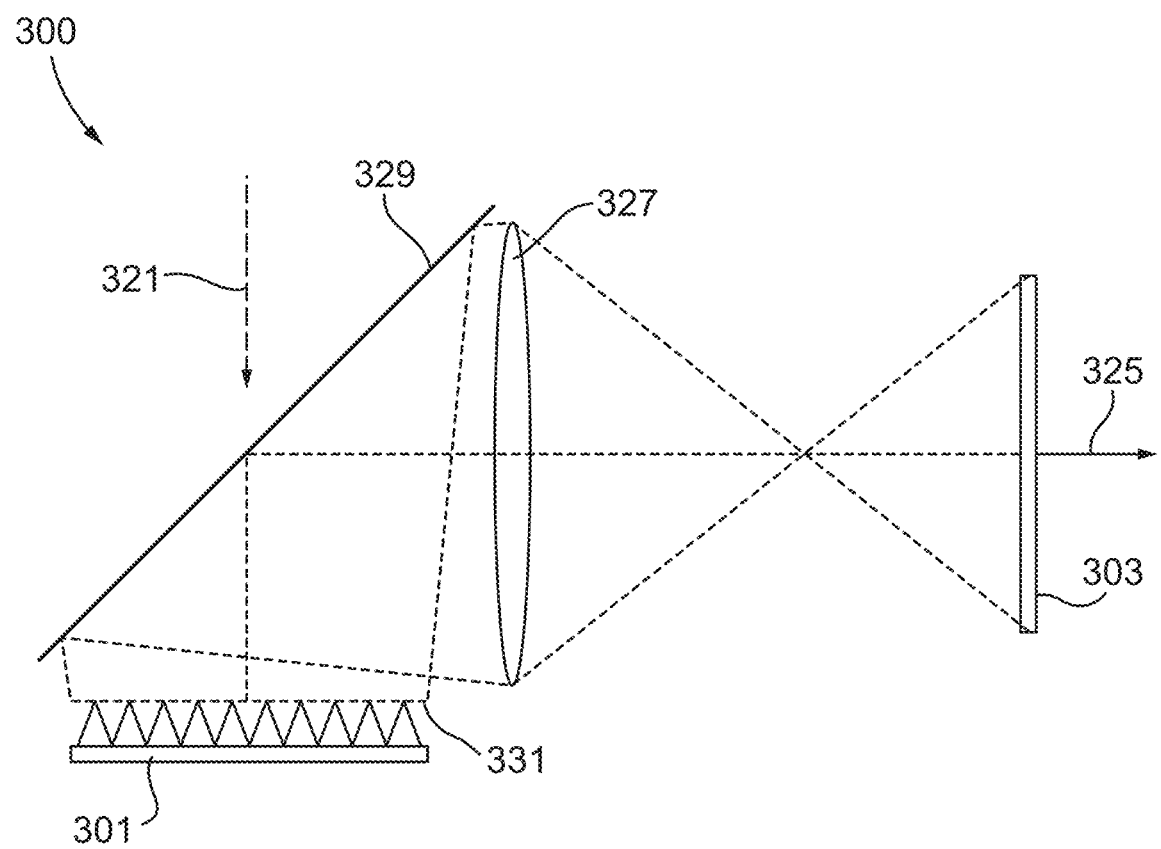
FIG. 6 is a schematic side view of an imaging device according to a fourth embodiment of the invention.

In a fourth example embodiment of the invention (FIG. 6) an imaging device 300 comprises a reflective liquid crystal Spatial Light Modulator (SLM) 301, a detector 303, a relay lens 327, a beam splitter 329, control electronics for controlling the SLM, and an image processor for providing image processing. The SLM further comprises a plurality of liquid crystal cells. The cells of the SLM comprise a plurality of patches, each of which are the same shape and size and formed of a contiguous group of an equal number of the cells. The image processor and control electronics are the same as in the first example embodiment of the invention. In this exemplary embodiment, the detector is an uncooled visible light focal plane array. The beam splitter 329 is arranged such that incident electromagnetic radiation 321 from the target scene is transmitted through the beam splitter, but that electromagnetic radiation reflected back from the SLM 301 is reflected towards the relay lens 327. The relay lens 327 is arranged to project an image 331 of the detector 303 adjacent and parallel to the SLM 301, such that electromagnetic radiation reflected from the SLM onto a surface of the image of the detector is also relayed onto a corresponding surface of the detector itself.

In operation, incident electromagnetic radiation 321 from the target scene is transmitted through the beam splitter and is incident upon the SLM. The control electronics operate as described in the first example embodiment of the invention, such that each patch of the SLM is controlled to form a respective reflective lens and therefore the SLM forms a plurality of lenses. Each of the formed lenses focuses incident electromagnetic radiation 321 onto the surface of the relayed image 331 of the detector 303. The relay lens 327 and beam splitter 329 relay the electromagnetic radiation reflected by the SLM 301 such that the detector 303 detects the radiation pattern as focussed onto the relayed image 331 of the detector. The detector 303 sends a signal 325 corresponding to the detected pattern of electromagnetic radiation to the image processor 307, which processes the detected pattern to produce an image.

Figure 7:
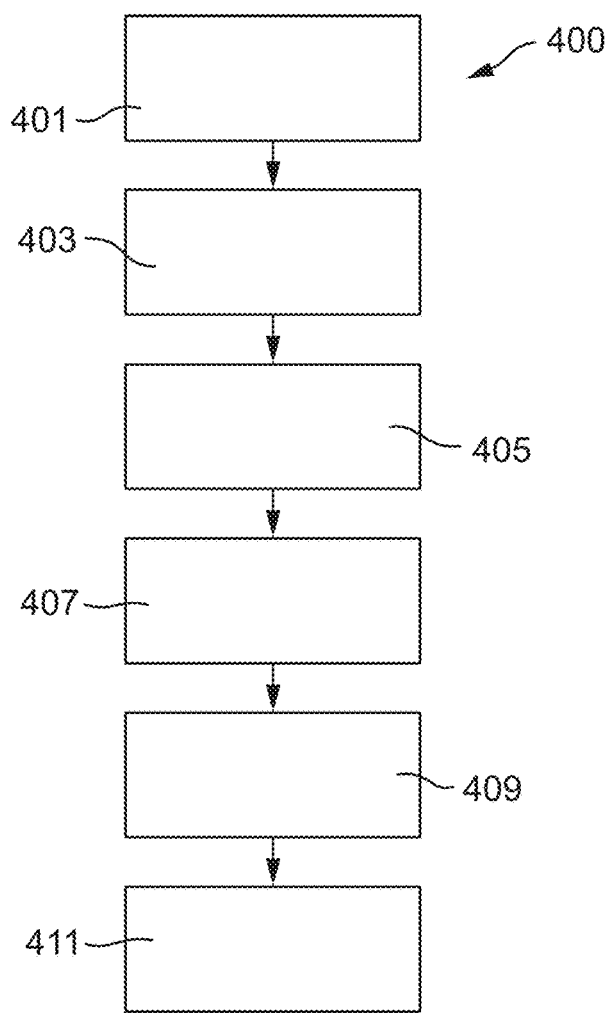
FIG. 7 is a flow chart illustrating the steps of a method according to a fifth embodiment of the invention.

FIG. 7 shows the steps of a method 400 according to a fifth example embodiment of the invention.

A first step, represented by box 401, comprises providing an array of liquid crystal cells, each providing a phase shift to electromagnetic radiation passing through the cell. A second step, represented by box 403, comprises controlling the phase shifts provided by each of the liquid crystal cells to form patches of cells into respective lenses. A third step, represented by box 405, comprises detecting the electromagnetic radiation that has passed through the liquid crystal cells. An optional fourth step, represented by box 407, comprises sharpening the multi-image formed by the detected electromagnetic radiation. An optional fifth step, represented by box 409, comprises de-multiplexing the multi-image into a plurality of single images. An optional sixth step, represented by box 411, comprises applying a super-resolution function to the plurality of single images. It will be appreciated that the steps may be performed concurrently and/or in a different order from that shown in FIG. 7.

Figure 8:
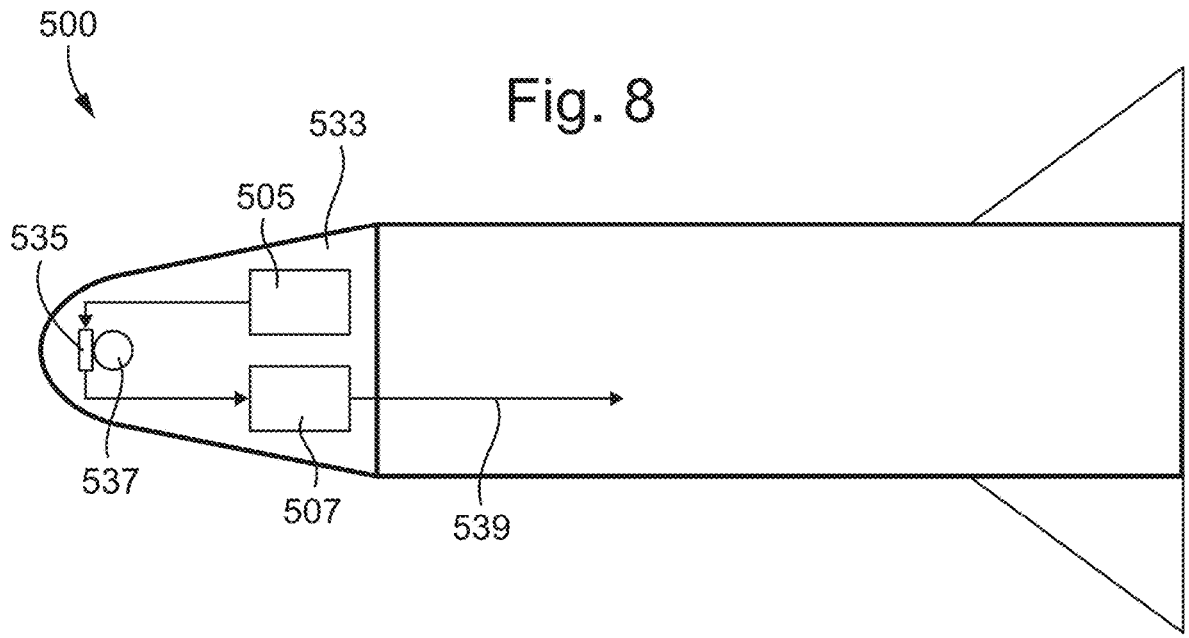
FIG. 8 shows a missile according to a sixth embodiment of the invention.

FIG. 8 shows a missile according to a sixth example embodiment of the invention, itself comprising an imaging device according to the first example embodiment of the invention. The missile 500 comprises a seeker 533. The seeker 533 comprises an SLM and detector 535, control electronics 505, and image processor 507, all as described in the first example embodiment of the invention. The seeker further comprises a gimbal 537, onto which the detector and SLM 535 are mounted. The image produced by the image processor, as described with respect to the first example embodiment, is output as a signal 539 for use by other missile subsystems, for example a guidance and navigation computer.

To provide the image resolution required by missile seekers and other imaging devices for a given size of detector pixel, a conventional optical system must be of a minimum length. This limits the minimum practical size of missile seekers.

The demands on a seeker can also vary with mission phase, for example at times the seeker may need a wide field of view, whilst at other times it may need fine resolution. To achieve both of these demands requires a compromise which may lead to neither demand being optimised. A zoom system may be used, but this adds even more size and complexity to the optics.

Missiles also usually have separate seekers and fuzes, because passive seekers with conventional optics generally cannot measure the range to a target, which is crucial information for a fuze.

Figure 9:
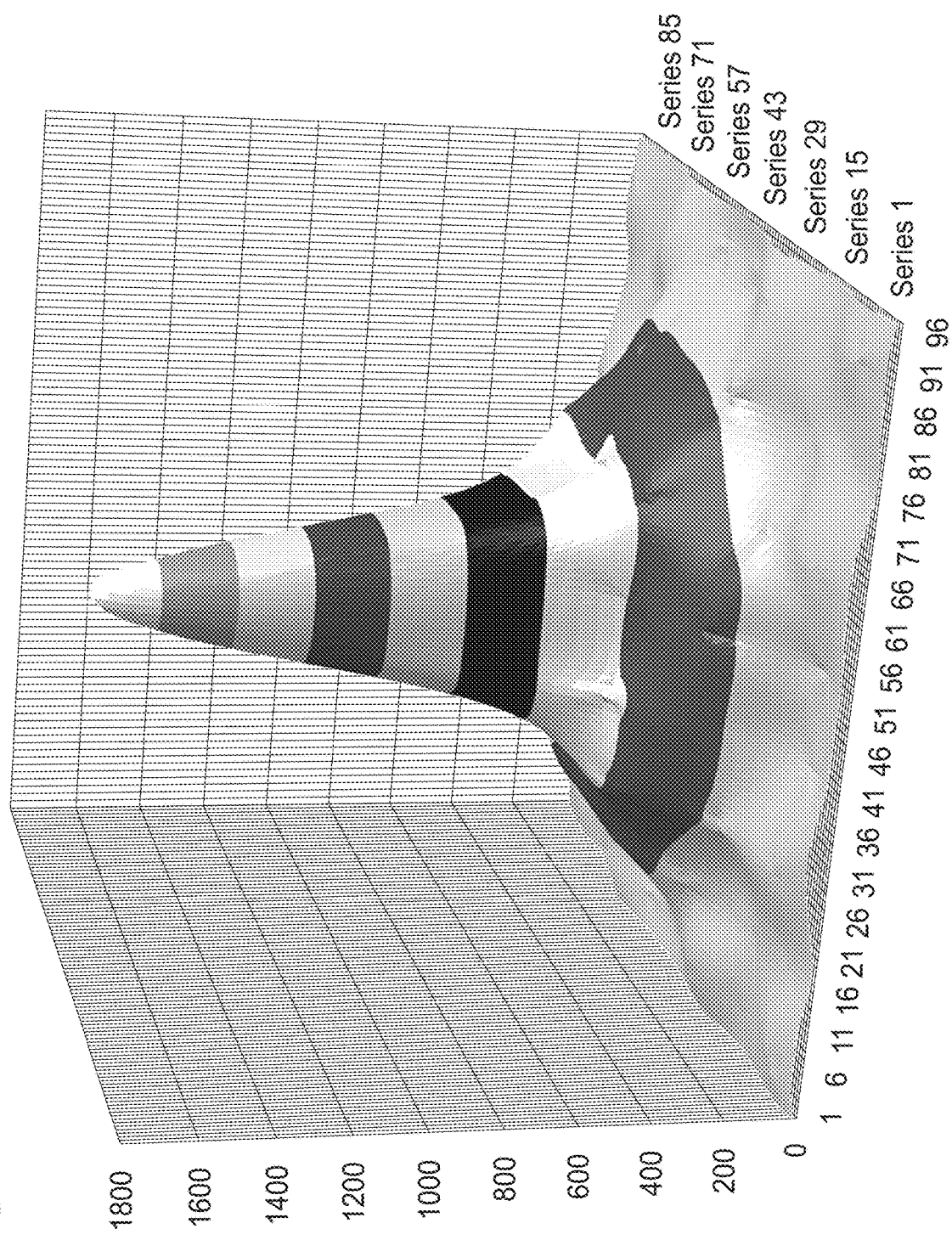
FIG. 9 is the output of a model of an embodiment of the invention.

Embodiments of the invention have been modelled using a number of methods and inputs, all of which have demonstrated those embodiments to conform to expected results and performance. FIG. 9 shows the point spread function (PSF) of an electromagnetic simulation of an imaging device according to an example embodiment of the invention when subjected to an incident plane wave. It should be noted that this electromagnetic simulation is based on a 7×7 cell patch. A typical imager design may use patches of up to for example 50 cells across and therefore may achieve significantly better results.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In example embodiments of the invention the physical separation between the detector and the SLM may be a distance of between for example 0.1 mm and for example 10 mm.

In example embodiments of the invention the separation between the SLM and the detector is adjustable. This provides a further degree of freedom which enables a much more flexible response than does a fixed configuration when configuring the imaging device and trading off various performance parameters (e.g. resolution, sensitivity, field of view, dynamic range, amount of beam steer). In some example embodiments of the invention, the optical distance between the SLM and detector is varied by use of a further liquid crystal cell, which may for example be a single cell as large as the whole SLM array.

In example embodiments of the invention the detector is positioned at an angle, relative to the SLM, to provide a sloped separation between the SLM and detector. This provides foveated imaging, as the patches subject to a greater separation effectively have a higher resolution than those subject to a smaller separation.

In example embodiments of the invention, the SLM may be one of an electrically addressed SLM or an optically addressed SLM.

In example embodiments of the invention, the SLM may have electrodes of a smaller than usual size in order to deliberately enhance cell edge effects. This can have the effect of smoothing the refractive index profile of the SLM, allowing the formation of less crude lenses.

In example embodiments of the inventions the detector may be for example one of an uncooled visible light detector, an uncooled medium wave infra-red (MWIR) detector, an uncooled short wave infra-red (SWIR) detector, or a cooled infra-red detector. Example embodiments incorporating a cooled detector may place the detector in a dewar and the SLM outside of the dewar. The detector may be placed at the end of the dewar nearest to the SLM or a relay lens may be used in order to position the SLM and detector sufficiently close together.

In example embodiments of the invention the image processor may further provide an image sharpening function, applied either before or after an image de-multiplexing function. In example embodiments of the invention, the SLM cells may be configured into multiple arrangements of patches. This allows the SLM to be divided into various areas, in each of which areas the patches are configured differently, for example providing higher FOV in one area and higher sensitivity in another.

In example embodiments of the invention patches are irregularly shaped. For example, an imaging device with rectangular patches provides higher resolution in one axis than the other. Irregularly shaped patches may be used across an entire SLM, or in select areas of the SLM.

In example embodiments of the invention the patches may be spaced on the SLM so as to avoid the single images produced by each patch overlapping, removing the need for an image de-multiplexing step. Alternatively, example embodiments of the invention may avoid the need for image de-multiplexing by using each of one or more patches, again arranged so as to avoid overlapping single images, to take a plurality of images over a period of time.

In example embodiments of the invention an additional convex lens is arranged parallel and adjacent to the SLM. This additional lens serves to diverge (for example purely to diverge) the optical axes of patches of the SLM, so as to provide shifted images suitable for super-resolution without the need for any image shifting by the SLM patches. This lens does not need to be positioned such that the SLM or detector lie in its focal plane, and can even be in direct contact with the SLM. Therefore, the inclusion of the additional lens does not prevent a very shallow imaging device design.

In example embodiments of the invention an additional graduated offset is applied to the refractive indices of the cells of the patches in order to provide beam steering. The same offset is applied to corresponding cells of each of the patches, such that the shift in stare direction for each patch is the same. In order to allow beam steering, sufficient refractive index must be kept spare for applying both the image shift for super-resolution and the required beam steering angle.

The approximate focal length of an SLM lens patch with a given image shift and for a given beam steering angle can generally be expected to be characterised by the following equation.

$$f = \sqrt{\left(\frac{d^2 + \left((n-1)\left(\frac{w}{2}\right)\cdot\sin\theta\right)^2 - \left((n-1)\cdot\frac{w}{2}\right)^2 - }{d\cdot(n-1)\cdot w\cdot\sin\theta - (n-1)\cdot w\cdot a}\right)^2 - a^2}$$

$$d = T(\eta_0 - \eta_i)$$

Where:
f=focal length
d=difference in optical path length through the outermost cell of a patch compared with that through the central cell
n=patch width in terms of number of cells
w=cell width
θ=beam steering angle
a=image shift for super-resolution
T=cell thickness
$\eta_{10}$=refractive index of the central cell of the patch
$\eta_i$=refractive index of the outermost cell of the patch In example embodiments of the invention the focal lengths and beam steering angles of the SLM patches may be varied in order to provide image stabilisation or to compensate for mechanical shock.

In example embodiments of the invention the focal length of one or more patches of the SLM may be varied and a measure of the image focus used in order to acquire depth measurements. This may facilitate determining the distance to a target, which may for example be used to provide a proximity fuse.

In example embodiments of the invention the image processor may be comprised of one or more of a microprocessor, field programmable gate array (FPGA), complex programmable logic device (CPLD), application specific integrated circuit (ASIC), or other processing device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of imaging, the method comprising:
controlling phase shifts provided by each of a plurality of liquid crystal cells included in an array, the array further including a plurality of patches with each patch having a set of liquid crystal cells of the plurality, such that each liquid crystal cell of a set of liquid crystal cells within a given patch provides a respective phase shift to electromagnetic radiation passing through the liquid crystal cell so that the given patch forms a corresponding lens that focuses electromagnetic radiation, wherein the plurality of liquid crystal cells are arranged in a planar configuration, such that a first surface of each liquid crystal cell of the plurality of liquid crystal cells define a first surface of the array, and a second surface of each liquid crystal cell of the plurality of liquid crystal cells define a second surface of the array, wherein electromagnetic radiation incident on the first surface of the array exits from the second surface of the array, and wherein said controlling includes controlling the phase shifts of the liquid crystal cells of a plurality of the patches to form a plurality of lenses corresponding with the plurality of patches that focus electromagnetic radiation; and
detecting the electromagnetic radiation that has passed through the liquid crystal cells.

2. The method of claim 1, further comprising performing de-multiplexing on one or more images and/or signals from the detected electromagnetic radiation.

3. The method of claim 1, further comprising sharpening one or more images corresponding to the detected electromagnetic radiation.

4. The method of claim 1, further comprising super-resolving a plurality of images corresponding to the detected electromagnetic radiation.

5. An imaging device including:
an array including a plurality of liquid crystal cells, the array being planar in that the liquid crystal cells of the plurality are arranged in a common plane in a contiguous group, each liquid crystal cell of the plurality providing a respective phase shift to electromagnetic radiation passing through the liquid crystal cell, wherein the liquid crystal cells of the plurality form a plurality of patches, wherein each patch is formed of a group of contiguous liquid crystal cells of the plurality;
a detector;
control electronics for controlling the phase shifts provided by each of the liquid crystal cells of the plurality, wherein the control electronics is configured to control the phase shifts of the liquid crystal cells of each patch, so that a given patch provides two or more phase shifts to electromagnetic radiation passing through the given patch and each patch forms a respective lens that focuses electromagnetic radiation focused on a surface of the detector, such that the plurality of patches form an array of lenses; and
an image processor for generating an image from electromagnetic radiation detected by the detector.

6. The imaging device of claim 5, wherein the array is planar and included in a liquid crystal spatial light modulator, and wherein the liquid crystal cells of the plurality are electrically addressed.

7. The imaging device of claim 6, wherein the liquid crystal spatial light modulator is at least one of a transmissive liquid crystal spatial light modulator or a reflective liquid crystal spatial light modulator.

8. The imaging device of claim 5, wherein each patch is rectangular in shape and formed of a contiguous group of liquid crystal cells of the plurality, wherein the imaging device further comprises a fixed lens, and wherein the fixed lens serves to diverge the optical axes of the lenses formed by the patches.

9. The imaging device of claim 5, wherein the imaging device is configured for use in or on a missile seeker.

10. A missile comprising the imaging device of claim 5.

11. A missile configured to perform the method of imaging in accordance with claim 1.

12. An imaging device comprising:
a liquid crystal spatial light modulator comprising liquid crystal cells arranged in a plurality of patches, such that the liquid crystal spatial light modulator includes at least (i) a first patch including a first plurality of liquid crystal cells, and (ii) a second patch including a second plurality of liquid crystal cells, wherein each liquid crystal cell is configured to provide a respective phase shift to electromagnetic radiation passing through the liquid crystal cell, wherein the liquid crystal cells are arranged in a planar configuration, such that a first surface of each liquid crystal cell define a first surface of the plurality of patches, and a second surface of each liquid crystal cell define a second surface of the plurality of patches, and wherein electromagnetic radiation incident on the first surface of the plurality of patches exits from the second surface of the plurality of patches;
a detector;
control electronics for controlling the phase shifts provided by each liquid crystal cell of the first and second plurality of liquid crystal cells, such that each of the first and second patches focuses electromagnetic radiation towards the detector; and an image processor for generating an image from electromagnetic radiation detected by the detector.

13. The imaging device of claim 12, wherein:
the first plurality of liquid crystal cells of the first patch includes at least a first liquid crystal cell, a second liquid crystal cell, and a third liquid crystal cell;
the first liquid crystal cell, the second liquid crystal cell, and the third liquid crystal cell provides a first phase shift, a second phase shift, and a third phase shift, respectively, such that the first patch acts as a lens and focuses electromagnetic radiation towards the detector; and the first, second, and third phase shifts are different from each other.

14. The method of claim 1, wherein controlling the phase shifts further comprises:
controlling the phase shifts such that a first cell, a second cell, and a third cell of the given patch is provided with a first phase shift, a second phase shift, and a third phase shift, respectively, such that the given patch focuses electromagnetic radiation towards a detector that detects the electromagnetic radiation, wherein the first, second, and third phase shifts are different from each other.

15. The method of claim 14, wherein controlling the phase shifts further comprises:
controlling the phase shifts such that a fourth cell of the given patch is provided with a fourth phase shift different from each of the first, second, and third phase shifts, such that the given patch focuses electromagnetic radiation towards the detector.

16. The method of claim 1, wherein the given patch has first liquid crystal cells on or near a periphery of the patch, and second liquid crystal cells on or near a center of the patch, and wherein controlling the phase shifts further comprises:
controlling the phase shifts such that (i) the first liquid crystal cells are provided with a first phase shift and (ii) the second liquid crystal cells are provided with a second phase shift different from the first phase shift, such that the given patch focuses electromagnetic radiation towards a detector that detects the electromagnetic radiation.

17. The method of claim 16, wherein the first phase shift is less than the second phase shift.

18. The imaging device of claim 12, further comprising a fixed lens arranged in the optical path between the liquid crystal spatial light modulator and the detector.

19. The imaging device of claim 12, wherein the imaging device is configured for use in or on a missile seeker.

20. A missile comprising the imaging device of claim 12.